United States Patent
Agarwal et al.

(10) Patent No.: US 8,250,634 B2
(45) Date of Patent: Aug. 21, 2012

(54) SYSTEMS, METHODS, MEDIA, AND MEANS FOR USER LEVEL AUTHENTICATION

(75) Inventors: Kaitki Agarwal, Westford, MA (US); Rajat Ghai, Sandwich, MA (US)

(73) Assignee: Cisco Technology, Inc., San Jose, CA (US)

( * ) Notice: Subject to any disclaimer, the term of this patent is extended or adjusted under 35 U.S.C. 154(b) by 829 days.

(21) Appl. No.: 11/950,682

(22) Filed: Dec. 5, 2007

(65) Prior Publication Data
US 2008/0168540 A1    Jul. 10, 2008

Related U.S. Application Data

(60) Provisional application No. 60/873,493, filed on Dec. 7, 2006.

(51) Int. Cl.
*H04L 29/00* (2006.01)
(52) U.S. Cl. ............ 726/5; 726/6; 726/7; 726/8; 726/9; 726/10
(58) Field of Classification Search .............. 726/5–10
See application file for complete search history.

(56) References Cited

U.S. PATENT DOCUMENTS

| | | | |
|---|---|---|---|
| 6,138,156 A | 10/2000 | Fletcher et al. | |
| 6,327,471 B1 | 12/2001 | Song | |
| 6,431,875 B1 | 8/2002 | Elliott et al. | |
| 6,477,590 B1 | 11/2002 | Habusha et al. | |
| 6,687,252 B1 | 2/2004 | Bertrand et al. | |
| 6,714,987 B1 | 3/2004 | Amin et al. | |
| 6,775,273 B1 | 8/2004 | Kung et al. | |
| 6,778,494 B1 | 8/2004 | Mauger | |
| 6,810,259 B1 | 10/2004 | Zhang | |
| 6,847,991 B1 | 1/2005 | Kurapati | |
| 6,853,630 B1 | 2/2005 | Manning | |

(Continued)

FOREIGN PATENT DOCUMENTS
EP    1414212    4/2004
(Continued)

OTHER PUBLICATIONS

International Search Report and Written Opinion for PCT Application No. PCT/US07/86886 mailed Apr. 10, 2008. (1 page).

(Continued)

*Primary Examiner* — Philip Chea
*Assistant Examiner* — Ghazal Shehni
(74) *Attorney, Agent, or Firm* — Wilmer Cutler Pickering Hale and Dorr LLP

(57) ABSTRACT

In some embodiments, a gateway in a communications network is provided including a subscriber interface and a Session Initiation Protocol (SIP) registrar; wherein the SIP registrar: receives a first register message as a result of a request associated with a user and a mobile device seeking network authentication; and sends a request for subscriber information to the subscriber interface; the subscriber interface: retrieves the subscriber information from the subscriber database; and sends the subscriber information to the SIP registrar; the SIP registrar further: sends challenge information including a password request and a request for predetermined response information previously selected by the user to the mobile device; receives a second register message including user response information in response to the challenge information; and authenticates the mobile device and the user based at least in part on whether the user response information matches the predetermined response information.

18 Claims, 7 Drawing Sheets

U.S. PATENT DOCUMENTS

| | | | |
|---|---|---|---|
| 6,854,014 B1 | 2/2005 | Amin et al. | |
| 6,888,821 B2 | 5/2005 | Rasanen et al. | |
| 6,973,309 B1 | 12/2005 | Rygula et al. | |
| 6,978,380 B1 * | 12/2005 | Husain et al. | 726/4 |
| 7,454,206 B1 | 11/2008 | Phillips et al. | |
| 7,613,836 B2 | 11/2009 | Tober et al. | |
| 2002/0029260 A1 | 3/2002 | Dobbins et al. | |
| 2002/0131404 A1 | 9/2002 | Mehta et al. | |
| 2002/0152179 A1 * | 10/2002 | Racov | 705/67 |
| 2003/0016630 A1 | 1/2003 | Vega-Garcia et al. | |
| 2003/0050076 A1 | 3/2003 | Watanabe | |
| 2003/0058872 A1 | 3/2003 | Berggreen et al. | |
| 2003/0188012 A1 | 10/2003 | Ford | |
| 2003/0227880 A1 | 12/2003 | Heller et al. | |
| 2004/0006573 A1 | 1/2004 | Takashi | |
| 2004/0047290 A1 | 3/2004 | Komandur et al. | |
| 2004/0054929 A1 * | 3/2004 | Serpa | 713/202 |
| 2004/0068574 A1 | 4/2004 | Costa Requena et al. | |
| 2004/0109414 A1 | 6/2004 | Choi et al. | |
| 2004/0109459 A1 | 6/2004 | Madour et al. | |
| 2004/0111476 A1 | 6/2004 | Trossen et al. | |
| 2004/0122954 A1 | 6/2004 | Shaheen | |
| 2004/0122967 A1 | 6/2004 | Bressler et al. | |
| 2004/0137918 A1 | 7/2004 | Varonen et al. | |
| 2004/0139230 A1 | 7/2004 | Kim | |
| 2004/0224688 A1 | 11/2004 | Fischer | |
| 2005/0002381 A1 | 1/2005 | Westman et al. | |
| 2005/0005025 A1 | 1/2005 | Harville et al. | |
| 2005/0009520 A1 * | 1/2005 | Herrero et al. | 455/435.1 |
| 2005/0021713 A1 | 1/2005 | Dugan et al. | |
| 2005/0083974 A1 | 4/2005 | Mayer et al. | |
| 2005/0111450 A1 | 5/2005 | Miyamoto et al. | |
| 2005/0124341 A1 | 6/2005 | Myllymaki et al. | |
| 2005/0190740 A1 | 9/2005 | Zhao et al. | |
| 2005/0201357 A1 | 9/2005 | Poyhonen | |
| 2005/0204052 A1 | 9/2005 | Wang et al. | |
| 2005/0233727 A1 | 10/2005 | Poikselka et al. | |
| 2006/0031559 A1 | 2/2006 | Sorokopud et al. | |
| 2006/0046714 A1 | 3/2006 | Kalavade | |
| 2006/0058056 A1 | 3/2006 | Das et al. | |
| 2006/0067244 A1 | 3/2006 | Sekaran et al. | |
| 2006/0104431 A1 | 5/2006 | Emery et al. | |
| 2006/0146792 A1 | 7/2006 | Ramachandran et al. | |
| 2006/0155871 A1 | 7/2006 | Ilkka et al. | |
| 2006/0193295 A1 | 8/2006 | White et al. | |
| 2006/0211423 A1 | 9/2006 | Ejzak et al. | |
| 2006/0239255 A1 | 10/2006 | Ramachandran et al. | |
| 2006/0251050 A1 | 11/2006 | Karlsson | |
| 2006/0256751 A1 | 11/2006 | Jagadeesan et al. | |
| 2006/0256779 A1 | 11/2006 | Lim et al. | |
| 2006/0264213 A1 | 11/2006 | Thompson | |
| 2006/0270404 A1 | 11/2006 | Tuohino et al. | |
| 2007/0022199 A1 | 1/2007 | Tatsubori | |
| 2007/0025301 A1 | 2/2007 | Petersson et al. | |
| 2007/0036078 A1 | 2/2007 | Chowdhury et al. | |
| 2007/0036079 A1 | 2/2007 | Chowdury et al. | |
| 2007/0041320 A1 | 2/2007 | Chen et al. | |
| 2007/0058561 A1 | 3/2007 | Virgile | |
| 2007/0066286 A1 | 3/2007 | Hurtta | |
| 2007/0076729 A1 | 4/2007 | Takeda | |
| 2007/0082681 A1 | 4/2007 | Kim et al. | |
| 2007/0097967 A1 | 5/2007 | Kauppinen et al. | |
| 2007/0156869 A1 | 7/2007 | Galchev et al. | |
| 2007/0206515 A1 | 9/2007 | Andreasen et al. | |
| 2007/0206617 A1 | 9/2007 | Andreasen et al. | |
| 2007/0209061 A1 | 9/2007 | Dekeyzer et al. | |
| 2007/0253371 A1 | 11/2007 | Harper et al. | |
| 2007/0254673 A1 | 11/2007 | Stenberg et al. | |
| 2008/0002592 A1 | 1/2008 | Yegani et al. | |
| 2008/0020775 A1 | 1/2008 | Willars | |
| 2008/0052387 A1 | 2/2008 | Heinz et al. | |
| 2008/0084867 A1 | 4/2008 | Foti et al. | |
| 2008/0095339 A1 | 4/2008 | Elliott et al. | |
| 2008/0130637 A1 | 6/2008 | Kant et al. | |
| 2008/0137541 A1 | 6/2008 | Agarwal et al. | |
| 2008/0219218 A1 | 9/2008 | Rydnell et al. | |
| 2008/0233947 A1 | 9/2008 | Herrero-Veron | |
| 2008/0254768 A1 | 10/2008 | Faccin | |
| 2009/0054037 A1 | 2/2009 | Kaippallimalil | |
| 2009/0109845 A1 | 4/2009 | Andreasen et al. | |
| 2009/0285225 A1 | 11/2009 | Dahod | |

FOREIGN PATENT DOCUMENTS

| | | |
|---|---|---|
| EP | 1414212 A1 * | 4/2004 |
| EP | 2092766 | 8/2009 |
| WO | WO-01/22642 | 3/2001 |
| WO | WO-2007/081727 | 7/2007 |
| WO | WO-2008/070869 | 6/2008 |
| WO | WO-2009/067445 | 5/2009 |

OTHER PUBLICATIONS

International Search Report and Written Opinion for PCT Application No. PCT/US07/86808 issued on Apr. 10, 2008. (1 page).

International Search Report and Written Opinion issued for International Patent Application No. PCT/US2007/086747 issued on May 7, 2008 (1 page).

International Search Report and Written Opinion issued for corresponding International Patent Application No. PCT/US2007/086802 issued on May 20, 2008 (1 page).

International Search Report for corresponding International Patent Application No. PCT/US2007/086884 issued on Apr. 10, 2008 (1 page).

<http://www.acmepacket.com/html/page.asp?PageID=%7bFB2657BA-EE7A-46C1-BEA8-F650C93BF5C3%7d> printed on Dec. 5, 2009 (19 pages).

<http://www.3gpp.org/ftp/Specs/html-info/24229.htm> printed on Dec. 5, 2009 (4 pages).

CT Labs Report, "SIP and RTP Denial of Service Attack Tests Summary Report", pp. 1-4, 2005.

http://www.3gpp.org, 3GPP TS 24.229 V6.12.0 (Sep. 2006), Oct. 3, 2006 (2 pages).

International Search Report and Written Opinion for PCT Application No. PCT/US2007/000132 issued on Oct. 22, 2007 (1 page).

International Search Report and Written Opinion for PCT Application No. PCT/US2008/83911 issued on Jan. 12, 2009 (1 page).

International Search Report for corresponding International Patent Application No. PCT/US2009/043696 issued on Jun. 24, 2009 (1 page).

3GPP TS 23.401 v8.3.0 (Sep. 2008), 3rd Generation Partnership Project; Technical Specification Group Services and System Aspects; General Packet Radio Services (GPRS) enhancements for Evolved Univeral Terrestrial Radio Access Network (E-UTRAN) access (Release 8), http://www.3gpp.org (39 pages).

3GPP TS 29.274 v1.3.0 (Oct. 2008), 3rd Generation Partnership Project; Technical Specification Group Core Network and Terminals; 3GPP Evolved Packet System; Evolved GPRS Tunnelling Protocol for Control Plane (GTPv2-C0; Stage 3 (Release 8); http://www.3gpp.org (1 page).

3GPP TS 36.413 v8.3.0 (Sep. 2008), 3rd Generation Partnership Project; Technical Specification Group Radio Access Network; Evolved Univeral Terrestrial Radio Access Network (E-UTRAN0; S1 Application Protocol (S1AP) (Release 8), http://www.3gpp.org (2 pages).

Nguyen-Vuong. "Mobility Management in $G Wireless Heterogeneous Networks", PhD thesis. Jul. 2, 2008. www.biblio.univ.evry.fr/theses/2008/2008EVRY00007.pdf (225 pages).

International Search Report and Written Opinion for International Application No. PCT/US09/64823 mailed Feb. 12, 2010 (1 page).

* cited by examiner

US 8,250,634 B2

SYSTEMS, METHODS, MEDIA, AND MEANS FOR USER LEVEL AUTHENTICATION

CROSS-REFERENCE TO RELATED APPLICATION

This application claims the benefit under 35 U.S.C. §119(e) of U.S. Provisional Patent Application No. 60/873,493, filed Dec. 7, 2006, which is hereby incorporated by reference herein in its entirety.

TECHNICAL FIELD

The disclosed subject mater relates to systems, methods, media, and means for user level authentication.

BACKGROUND

Authentication and authorization of a mobile digital processing device to a network can be based on the identity of the mobile digital processing device or the identity of a card within the mobile digital processing device. For example, IP Multimedia Subsystem (IMS) and Multimedia Domain (MMD) registration and authentication mechanisms are based on pre-configured shared keys in the IMS Subscriber Identity Module (ISIM) and the Home Subscriber Server (HSS). However, these keys and other identifying information are stored in the mobile device. When a user connects to the network, information from the Subscriber Identity Module (SIM), from the mobile device itself (e.g., serial number), or other identifying information is used to authenticate and authorize the mobile device and the account attached to the mobile device. Therefore, if a first person were to share a mobile device with a second person, this second person would be using the first person's account and services because it is the first person's mobile device and the account is attached to that mobile device and/or SIM card. The mobile device can include, for example, a portable phone, a cellphone, a personal digital assistant (PDA), and/or a laptop computer connected to, for example, a cellular network. Such devices can be referred to as, for example, user equipment (UE) or mobile stations (MS).

SUMMARY

Systems, methods, media, and means for user level authentication are provided. In some embodiments, a gateway in a communications network is provided. The gate way including a subscriber interface; a Session Initiation Protocol (SIP) registrar; and a network interface in communication with the subscriber interface, the SIP registrar, a subscriber database, and a mobile device; wherein the SIP registrar: receives a first register message as a result of a request associated with a user and a mobile device seeking network authentication; and sends a request for subscriber information to the subscriber interface; the subscriber interface: retrieves the subscriber information from the subscriber database; and sends the subscriber information to the SIP registrar; the SIP registrar further: sends challenge information including a password request and a request for predetermined response information previously selected by the user to the mobile device; receives a second register message including user response information in response to the challenge information from the mobile device; authenticates the mobile device and the user based at least in part on whether the user response information matches the predetermined response information; and notifies the subscriber interface of the authentication. In some embodiments, the subscriber database is a Home Subscriber Server (HSS) and the SIP registrar is a serving call session control function (S-CSCF). In some embodiments, authentication includes authentication, authorization, and registration. In some embodiments, predetermined response information includes a question to the user.

In some embodiments, methods for authenticating a mobile device and a user are provided. The methods including receiving a first register message as a result of a request associated with a user and a mobile device seeking network authentication at a SIP registrar; and sending a request for subscriber information to a subscriber interface from the SIP registrar; retrieving the subscriber information from a subscriber database at the subscriber interface; and sending the subscriber information to the SIP registrar from subscriber interface; sending challenge information including a password request and a request for predetermined response information previously selected by the user to the mobile device from the SIP registrar; receiving a second register message including user response information in response to the challenge information from the mobile device at the SIP registrar; authenticating the mobile device and the user based at least in part on whether the user response information matches the predetermined response information at the SIP registrar; and sending notification of authentication to the subscriber interface from the SIP registrar.

In some embodiments, gateways in a communications network are provided. The gateways including means for receiving a first register message as a result of a request associated with a user and a mobile device seeking network authentication at a SIP registrar; means for sending a request for subscriber information to a subscriber interface from the SIP registrar; means for retrieving the subscriber information from a subscriber database at the subscriber interface; means for sending the subscriber information to the SIP registrar from subscriber interface; means for sending challenge information including a password request and a request for predetermined response information previously selected by the user to the mobile device from the SIP registrar; means for receiving a second register message including user response information in response to the challenge information from the mobile device at the SIP registrar; means for authenticating the mobile device and the user based at least in part on whether the user response information matches the predetermined response information at the SIP registrar; and means for sending notification of authentication to the subscriber interface from the SIP registrar.

In some embodiments, gateways in a communications network are provided. The gateways including a subscriber interface residing in the gateway in communication with a serving-call session control function (S-CSCF) and a subscriber database to register and authenticate a mobile device and a user; the S-CSCF caches subscriber information in the gateway including a password and predetermined response information previously selected by the user and received from the subscriber database through the subscriber interface and challenges the mobile device with challenge information including a request for the password and a request for the predetermined response information; and the S-CSCF authenticates a response to the challenge information and updates the cache.

In some embodiments, gateways in a communications network are provided. The gateways including means for caching subscriber information in the gateway including a password and predetermined response information previously selected by the user and received from a subscriber database through a subscriber interface and challenging the mobile device with challenge information including a request for the password and a request for the predetermined response information; and means for authenticating a response to the challenge information and updating the cache.

DETAILED DESCRIPTION

Systems, methods, media, and means for user level authentication are provided. In some embodiments, when a user attempts to logon to a network, the network presents the user with challenge information associated with the user's account. If the user can respond with correct answers to the challenge information, the network will allow the user to logon to the system (e.g. register, authenticate, and authorize the user). This can allow, for example, a first user to use the mobile device of a second user while having access to the first user's services and/or having the first user's use charged to the first user's account.

Figure 1:
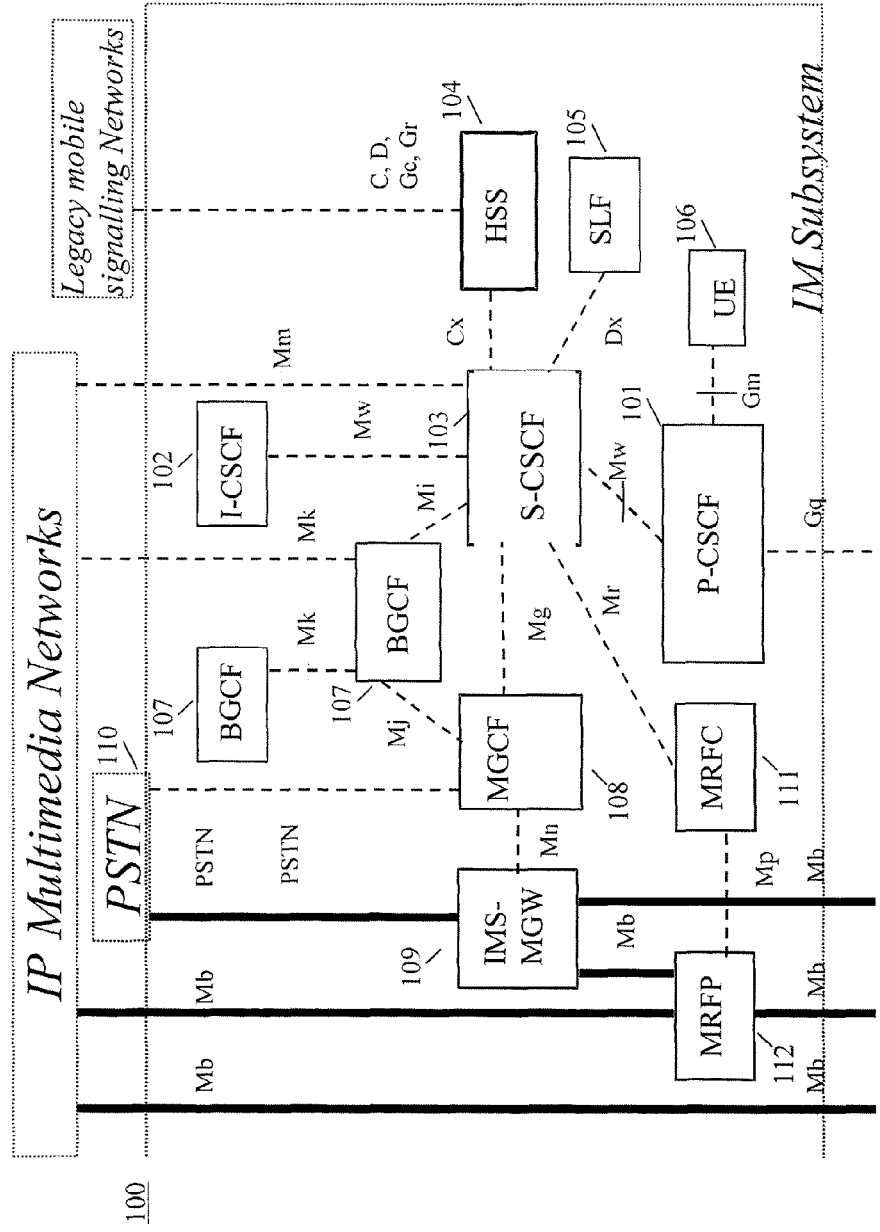
FIG. 1 is a simplified illustration of an IP Multimedia Subsystem (IMS) which can be used in accordance with some embodiments of the disclosed subject matter.

Various embodiments of the disclosed subject matter can be used with various network types, protocols, standards, and/or topologies. For example, FIG. 1 illustrates an IP Multimedia Subsystem (IMS) 100, which is a network architecture that can provide users with mobile and fixed multimedia services implemented as, for example, functions. A function can be implemented on a dedicated node, spread over multiple nodes, or can be implemented on the same node as other functions and/or applications. For example, these functions can be implemented on an ST16 Intelligent Mobile Gateway available from Starent Networks, Corp.

Some functions can be grouped into logical units. For example, a Call Session Control Function (CSCF) includes three functions: a Proxy-CSCF (P-CSCF) 101, an Interrogating CSCF (I-CSCF) 102, and a Serving CSCF (S-CSCF) 103. A CSCF can manage much of the signaling that occurs in an IP IMS core. CSCF functions can be embodied in various forms and can be used with various network topologies and/or standards. For example, a CSCF can be use in both the Global System for Mobile Communications (GSM) standard and the Code Division Multiple Access (CDMA) 2000 standard. The 3rd Generation Partnership Project (3GPP) is responsible for IMS which works with GSM systems. The 3rd Generation Partnership Project 2 (3GPP2) is responsible for Multimedia Domain (MMD) which is used with CDMA systems and is based on the 3GPP IMS concept.

FIG. 1 also includes a Home Subscriber Server (HSS) 104, a Subscriber Location Function (SLF) 105, User Equipment (UE) 106, Breakout Gateway Control Function (BGCF) 107, Media Gateway Control Function (MGCF) 108, Media Gateway (MGW) 109, Public Switched Telephone Network (PSTN) 110, Multimedia Resource Controller (MRFC) 111, Multimedia Resource Function Processor (MRFP) 112. The HSS 104 is a master user database that supports the S-CSCF or other network entities that handle calls and sessions. The HSS 104 stores subscription-related information such as user profiles, performs user authentication and authorization, and can provide information about the physical location of a user. When multiple HSS's are used in a network, an SLF 105 can be used to direct the queries to the HSS 104 storing the information. Legacy signaling networks may also use the HSS 104 for services. The MRFC 111 communicates with the S-CSCF and controls the MRFP 112 to implement media related functions. The combination of the MRFC 111 and MRFP 112 provides a source of media in the home network. The BGCF 107 is a server that can route based on telephone number and is used when calling to a phone on the circuit switched network. The MGCF 108 and MGW 109 are used to convert signaling from IMS to that which is appropriate for PSTN 110 circuit switched networks. The IP Multimedia Networks can include application servers and other network entities that provide services to User Equipment (UE). The UE can include, for example, a cell phone, a personal digital assistant (PDA), or a laptop computer.

Figure 2:
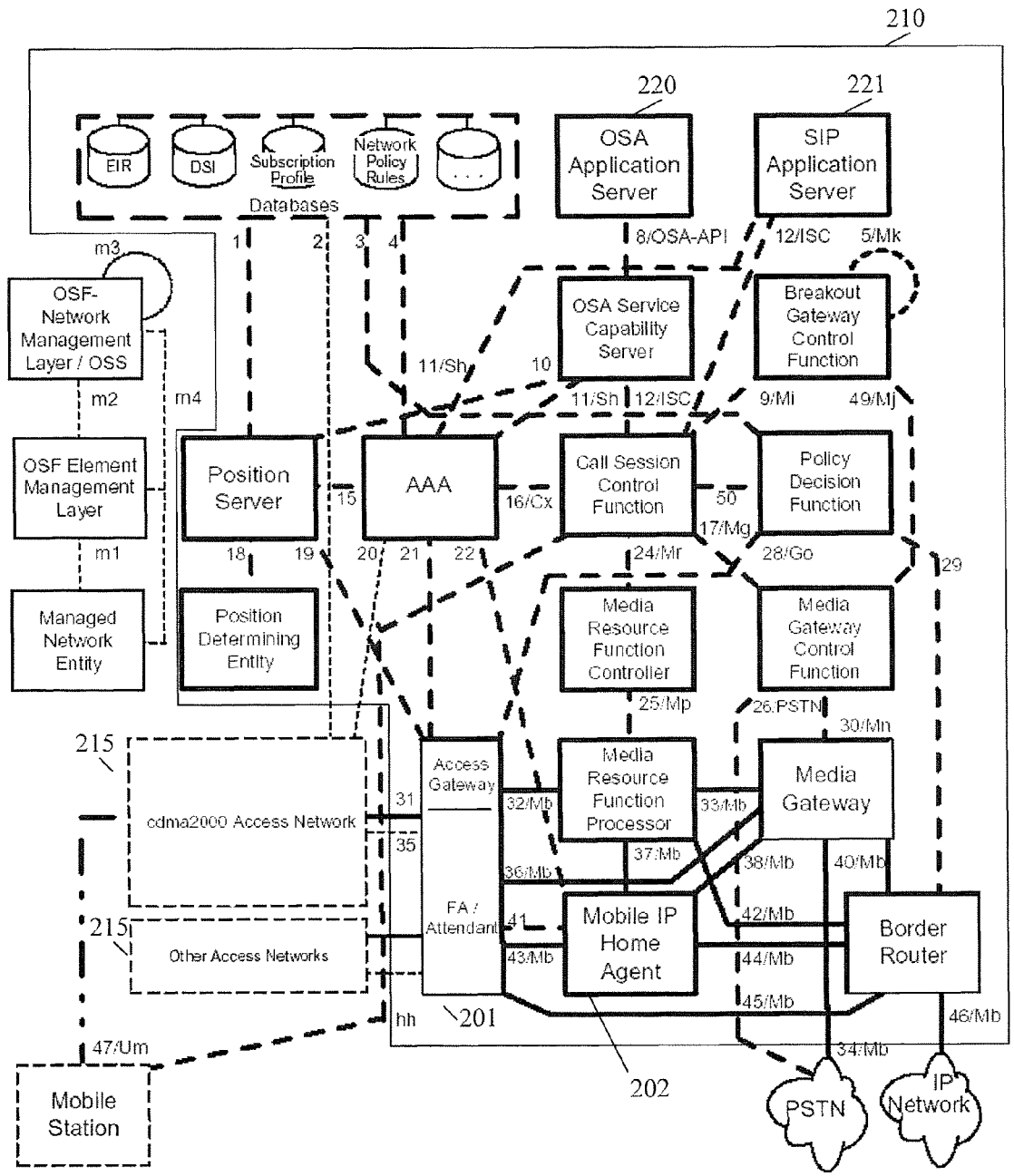
FIG. 2 is a simplified illustration of a Multimedia Domain (MMD) system which can be used in accordance with some embodiments of the disclosed subject matter.

FIG. 2 illustrates an MMD system 210 within a larger network 200. The MMD system 210 includes many of the same functions as the IMS system 100 of FIG. 1, but further includes an access gateway/foreign agent 201 to communicate with access networks 215, as well as a home agent 202 to provide Mobile IP support to mobile stations (e.g., cell phone, PDA, laptop, etc.).

In the context of the IMS and MMD systems, a P-CSCF can be the initial interface between, for example, a mobile device and an IMS. A P-CSCF is typically located in a visited network or in a home network when the visited network is not IMS compliant. The P-CSCF acts as a Session Initiation Protocol (SIP) proxy and can forward messages from the user equipment or mobile station to the appropriate network entity and from a network entity to the user equipment/mobile station. The P-CSCF can inspect messages, provide SIP message compression/decompression using, for example, SIGComp, provide a security associate to the UE/MS, and generate charging data records (CDR) because it sits on the path of the signaling message. The P-CSCF can also include or communicate with a policy decision function (PDF) that authorizes media resources such as the provided quality of service (QoS), management of bandwidth, and provided access.

The I-CSCF is the contact point within a network for connections destined to a user of that network or a roaming user currently located within the network's service area. The I-CSCF assigns an S-CSCF to a user so that the user can communicate with the network. The I-CSCF's IP address can be published in a Domain Name System (DNS) so that remote servers can find it and use it as an entry point.

The S-CSCF performs the session control services for the, for example, UE/MS. This includes handling registration of the UE/MS, inspecting messages being routed through the S-CSCF, deciding which application server provides service, providing routing services such as sending messages to the chosen application server or to a PSTN, and enforcing the policies of a network for a given user. The S-CSCF can also communicate with the HSS to access user profiles and other information.

Application servers (e.g., 220 and 221) can host and execute services such as caller ID, call waiting, call holding, push-to-talk, call forwarding, call transfer, call blocking services, lawful interception, announcement services, conference call services, voicemail, location based services, and presence information. The application servers can interface with the S-CSCF using SIP and, depending on the service, can operate in an SIP proxy mode, an SIP user agent mode, or an SIP back-to-back user agent mode.

Figure 3:
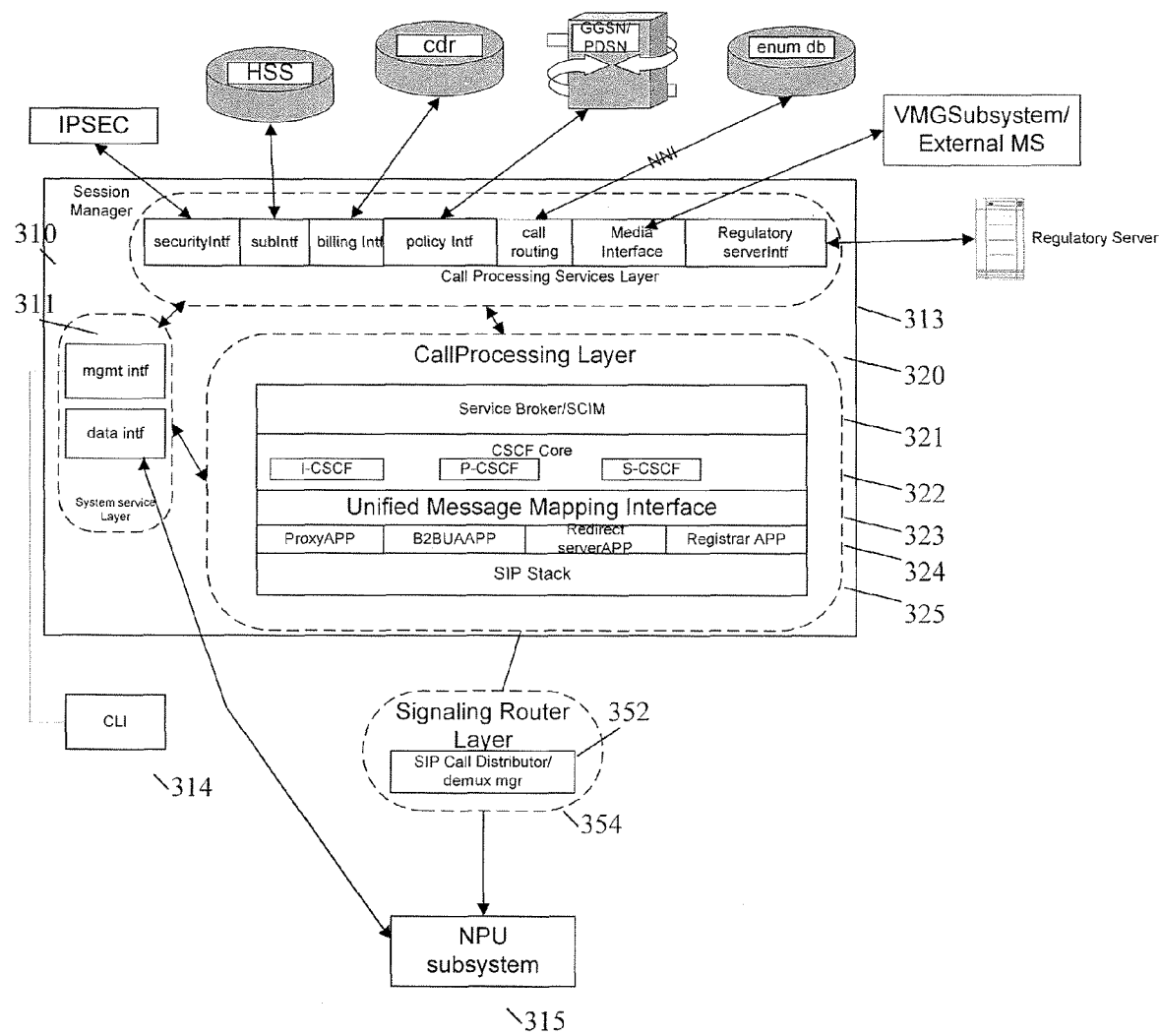
FIG. 3 illustrates a control plane architecture for an IMS/MMD solution that can be used in accordance with some embodiments of the disclosed subject matter.

FIG. 3 illustrates a control plane architecture for an IMS/MMD solution that can be used in accordance with some embodiments. A session manager 310 services and processes user session data flow for user equipment(UE)/mobile subscribers(MS). The session manager 310 includes functional layers such as a system service layer 311, a call processing layer 320, and a call processing support services layer 313. The system services layer 311 provides an interface for instructions to be passed to the session manager 310 and the other layers. A command line interface (CLI) 314 as well as network processing unit interface 315 can be included. The call processing layer includes a service broker/ Service Control Interaction Manager (SCIM) 321, a CSCF core 322 that includes an I-CSCF, an P-CSCF, and an S-CSCF, a unified message mapping interface 323, applications 324, and a SIP stack 325. The call processing support services layer 313 includes a variety of services such as routing and address translation service, subscriber management service, changing interface service, media interface service, QoS policy interface service, security interface, and regulatory server interface.

Returning to the call processing layer 320, this layer includes signaling protocols and call control using universal SIP as an application program interface (API). The signaling protocols can be, for example, SIP, ISUP, MGCP, or H.323. Further, the call processing layer 320 allows inter-working between SIP variants and other protocols through a unified messaging mapping (UMM) interface. The UMM interface can convert protocol specific messages and parameters to the universal SIP like API format. SIP like messaging is used, in some embodiments, because SIP has a large message set and can cover the possible messaging scenarios for SIP and other protocols.

A demux manager 352 resides in the signal routing layer 354, as shown in FIG. 3. The signal routing layer 354 with the demux manager can determine where a packet flow is sent for processing. The packet flow can be sent to a process instance for further processing and/or signal handling. The demux manager can be used to analyze packet flows or traffic entering into a gateway. This analyzing may encompass packet sniffing, extracting of information from packet headers, sorting extracted information, deep packet inspection, and processing of information obtained from one or more packets. Messages analyzed by a demux manager can contain information which can be extracted (or sniffed) such as an IP-address assigned to the mobile node, Address of Record (AOR)/public user id.

The demux manager can also direct packet flows among functions internal to the gateway and physical entities to which other functions are mapped. In directing packet flows, demux manager can steer packet flows to balance loads. For example, if a packet is to be sent to more than one function and order does not matter, the demux manager sends the packet to the least loaded or a less congested function. The demux manager, in some embodiments, can determine congestion based on outstanding packets at different functions or from the delay when one or more packets return to the demux manager. Information extracted from packets can be cached locally in the signal routing layer to allow processing to occur without retrieving information from external databases.

In certain embodiments, incoming packets are sent to a first in, first out (FIFO) queue in the demux manager. The packet at the head of the queue is de-queued and inspected to see how long the packet has been waiting in the queue. If the packet has waited longer than a pre-set time, the packet is deemed to be too old and dropped. Otherwise, the packet is inspected to see if a new session is to be established or if the packet is to be routed to a session manager instance or other function. If a new session is to be established, a session manager selection routine is invoked and the packet is forwarded to the selected session manager. Packets that belong to an already established session are forwarded to the corresponding session manager previously selected. A demux manager can keep a list of the session managers and assign a weighted load factor to each session manager. The list is sorted by the weighted load factor so the least loaded session manager can be selected for a new session.

The load factor can be determined by calculating the following parameters: the number of active sessions, dormant sessions, outstanding requests, round trip time, and the load on the processing unit where the session manager is running, in some embodiments. The load factor can be calculated by obtaining a maximum value for each of the parameters and determining how each session manager is relative to the maximum. Each of the parameters is assigned a percentage with the total adding to 100. The parameters and the list sort order can be periodically updated. Depending on the availability and load levels indicated in the list, new sessions managers can also be added dynamically.

As mentioned above, the demux manager inspects the packets and completes a certain amount of processing, in certain embodiments. The processing can involve parsing the packet header to extract information in some of the fields, with some or all of this information being cached, if the information is not stored already. The information can be used to verify the packet's authenticity (e.g., the packet is not part of some attack on the system) and to validate that the packet is not malformed. The information that can be cached includes Contact (IP address/Fully qualified domain name of mobile node) and Address of record/Public user Id. The packet is then routed to the session manager handling the packet's session.

Figure 4:
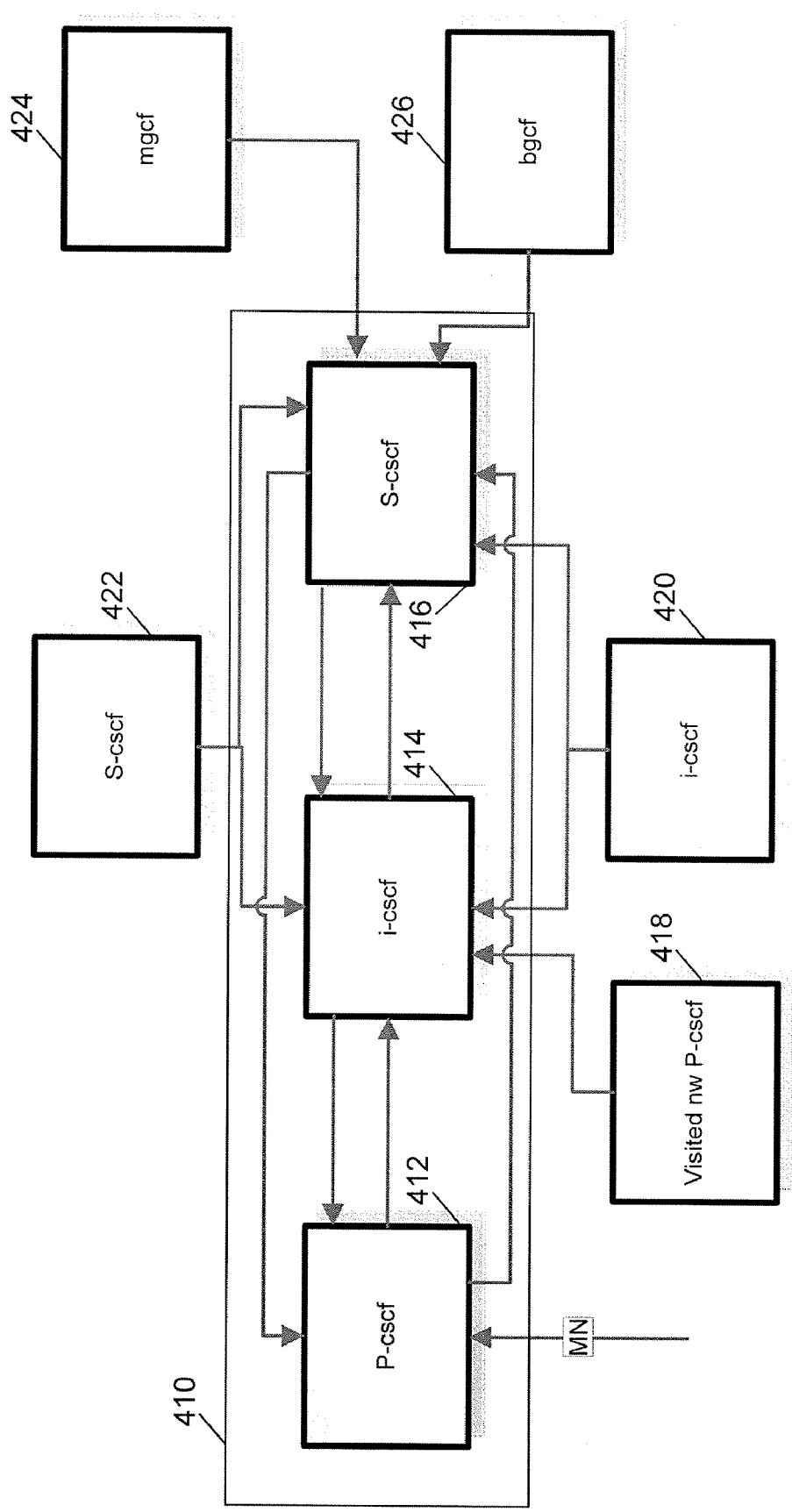
FIG. 4 is a block diagram of flows through a gateway and among functions in accordance with some embodiments of the disclosed subject matter.

Demux manager provides direction handling of packets for a collapsed call session control function (CSCF), in certain embodiments, which can be implemented on the gateway and with external CSCF entities. Direction handling can be implemented based on a rule or rule set in a collapsed CSCF in some embodiments. FIG. 4 illustrates CSCF component interaction in accordance with certain embodiments. FIG. 4 includes a gateway 410, a collapsed P-CSCF 412, a collapsed I-CSCF 414, a collapsed S-CSCF 416, a visited network P-CSCF 418, an I-CSCF 420, a S-CSCF 422, a media gateway control function (MGCF) 424, and a border gateway control function (BGCF) 426. If a packet is coming from a mobile device or a visited network P-CSCF 420 then analysis can be performed on originating address and/or on the destination address. If both the numbers are not registered within the same network device such as the gateway, then the packets are proxied to an external entity as described in the routing table below.

In some embodiments, demux manager sends packet(s) to the session manager instance that can handle the session or that is already handling the session. To identify the session manager instance handling the session, the demux manager determines whether to analyze based on an originating subscriber address or a destination subscriber address. Based on the network device or the entity the message is coming from, the demux manager can determine whether to look for a source or a destination address. In some embodiments, some proprietary parameter is inserted into a SIP message to aid the decision without much, if any, additional analysis.

The logic in demux manager to identify the session manager can be implemented as follows. Check the via/source address. If this address matches one of the registered address then the packet is coming from the mobile node. Otherwise, if via/source address matches one of the peering server addresses, then use that information to make a routing decision and perform the origination/destination address analysis. Otherwise, if via/source address matches one of the cached server's information received from service route/path, use that information to make the routing decision, and add a direction flag in the subscriber table. Otherwise, do the destination address analysis assuming the call (or packets) is coming from the network and if destination address is also not there in the hash table, then allocate to a new session manager.

The table below describes direction handling of incoming packets by a demux manager and/or session manager when the gateway is acting as a P-CSCF only in accordance with certain embodiments. P-CSCF receives messages from the following components: one or more mobile nodes, a home network I-CSCF, and a home network S-CSCF.

| Incoming interface | Incoming Message | Parameter Handling | Direction analysis |
| --- | --- | --- | --- |
| Mobile node to P-CSCF | Register | P-CSCF adds a Path header | Register comes to the P-CSCF from a mobile node. Demux manager allocates a session manager instance and passes the register message to that instance. |
| I-CSCF/S-CSCF to P-CSCF | 200 ok for Register | P-CSCF stores the service route info. | Demux manager checks for the presence of a service route header to identify the function that is to be performed. If the service route header is present, the message is likely either coming from a S-CSCF or an I-CSCF. Otherwise, the demux manager can perform a destination address analysis to determine direction. |
| Mobile node to P-CSCF | Non register dialog creating request | none | If a security association is present the request goes to the session manager instance handling the session because the messages are sent on the port exchanged during security association setup. The session manager handling the session receives incoming packets on the port exchanged during setup. When received at the session manager either before or instead of at the demux manager, a search similar to the demux manager's search is performed at the session manager to find the direction. If the source IP address is a registered subscriber, then the session manager performs P-CSCF functionality processing. If a security association is not present, demux manager routes the packet(s) to the session manager instance handling the session. A proprietary header can be inserted by the demux manager to indicate whether the message is for originating subscriber or destination subscriber so that CSCF core does not have to perform the same analysis again. Based on the proprietary parameter session manager can be alerted to perform P-CSCF functionality processing. |
| S-CSCF/I-CSCF to P-CSCF | Non register dialog creating requests | none | The path header information is stored by S-CSCF in the session manager instance and can be sent in incoming requests coming from I-CSCF and S-CSCF in the route header. If this string (pcscf_smgr_instance) is present in the username of the route header, CSCF core performs P-CSCF processing. Also demux manager can be alerted to perform analysis on the destination number and send the analysis to the session manager instance where the destination subscriber is registered. |

The table below describes direction handling of incoming packets by a demux manager and/or session manager when receiving messages or packets for an I-CSCF. An I-CSCF can receive messages from the following interfaces: a home P-CSCF 412, a visited network P-CSCF 418, a home S-CSCF 422, an external I-CSCF 420, an external S-CSCF 422, and an external BGCF 426.

| Incoming interface | Incoming Message | Parameter Handling | Direction analysis |
| --- | --- | --- | --- |
| Home/visited P-CSCF | Register | Store address received in | If path parameter is present, the packet is coming from P-CSCF and the demux manager allocates a session manager (if not a re-registration or de-registration) and |

-continued

| Incoming interface | Incoming Message | Parameter Handling | Direction analysis |
|---|---|---|---|
| | | via as that is the P-CSCF address. | passes the register message to the session manager instance. CSCF core checks for the presence of path header. If I-CSCF function is configured and the path header is present in the register message coming from demux manager, I-CSCF is the first contact point for the message and performs I-CSCF functionality. |
| Home S-CSCF | 200 OK for Register | Store service route header. | Since the service route is present demux manager knows the direction, and CSCF core performs I-CSCF function to the packet(s). |
| Home/visited P-CSCF | Non REGISTER dialog creating request | none | Demux manager identifies the session manager instance by looking at the route header that includes the session manager instance. CSCF core checks the via. If the via is one of the peering servers or a P-CSCF via address obtained during registration, the CSCF core performs the I-CSCF function for originating subscriber. If topology hiding is not required non register messages can go directly to the S-CSCF by-passing the I-CSCF. |
| External network I-CSCF/S-CSCF/bgcf | Non register dialog creating request | none | If the packet(s) are not coming from the P-CSCF interface, the packet(s) are bound for a destination subscriber or for proxying to another proxy. Demux manager performs a destination address analysis to determine the session manager instance handling the session. If one is found the packet(s) are routed to that instance. At CSCF core, the packet(s) are checked using the learned P-CSCF address to determine if the packets are coming from the mobile node or a P-CSCF for I-CSCF function processing. Otherwise S-CSCF function processing is performed. |
| Home S-CSCF | Non register dialog creating request | none | Direction handling is performed by the demux manager by looking at the peering server table. |

Figure 5:
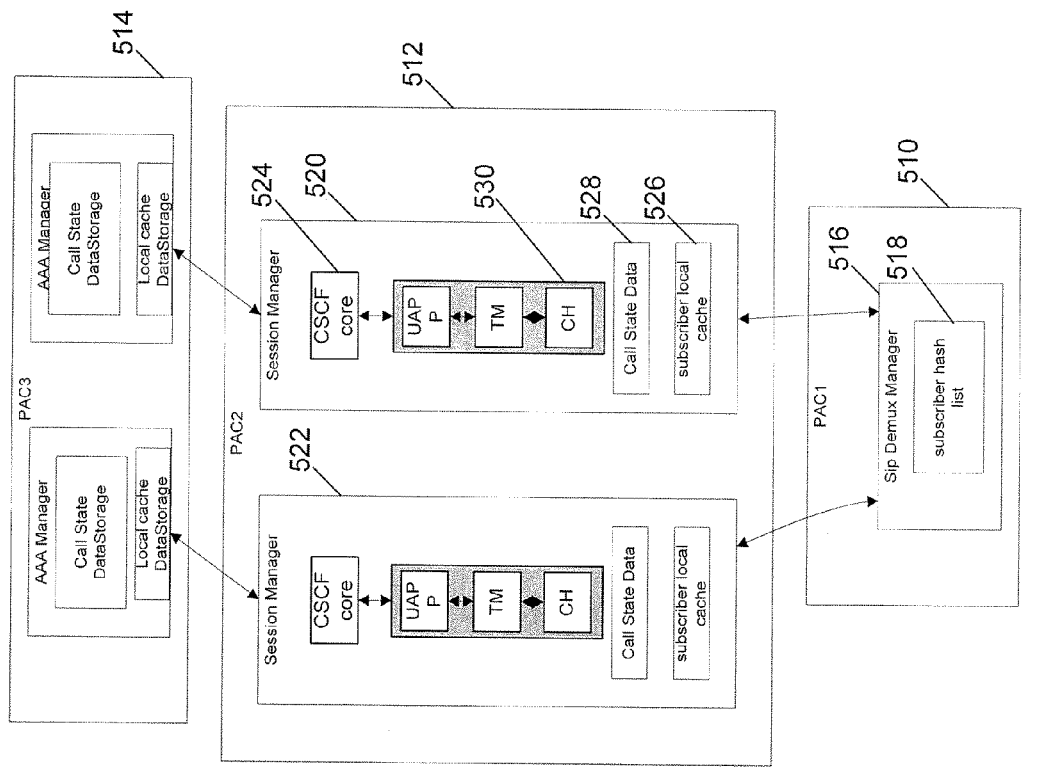
FIG. 5 is a block diagram of an implementation of various components within a gateway in accordance with some embodiments of the disclosed subject matter.

From the above tables, it can be appreciated that the demux manager and the session manager, which includes CSCF core functionalities, work together to direct and process packets. FIG. 5 illustrates an implementation of demux and session manager in accordance with certain embodiments. FIG. 5 includes packet accelerator card (PAC) 510, PAC 512, and PAC 514. PACs 510, 512, and 514 may also be implemented in a packet services card (PSC) or any other applicable hardware/software configuration. PAC 510 implements a SIP demux manager 516 which includes subscriber hash list 518. SIP demux manager 516 can be used to direct SIP messaging and packets to the session manager handling the session and to external functions. The SIP demux manager 516 can cache information about a session and a subscriber in a subscriber hash list 518 to reduce delay in directing packets to their corresponding session managers.

PAC 512 implements session manager 520 and 522. Session manager 520 includes a CSCF core 524, a subscriber local cache 526, a call state data 528, and a SIP stack 530. CSCF core 524 can include a P-CSCF, a S-CSCF, and a I-CSCF or can implement the functions of a P-CSCF, a S-CSCF, and/or a I-CSCF on packet(s) in session manager 520. Subscriber local cache 526 includes a number of pieces of information which can be used to, for example, reduce lookup times for routing packets from the session manager or reduce direction analysis processing time:

1. AOR/public user identity
2. Private user identity (unique for a subscriber, could be IMSI)
3. Contact
4. Registration expiry
5. Registration status (active, expired)
6. Service route header/path header
7. Auth vector
8. Subscriber profile Call state data includes information about the state of sessions, such as, for example, registered, alerting, answered, and release wait (which can be used to make decision to allocate resources, deallocate resources, and/or accept and/or reject messages coming from the network) a SIP stack 530 includes a connection handler (CH), a transaction manager (TM), and a user application (UAPP). The connection handler manages the connections to remote servers over a single communications interface, and handles the formatting and multiplexing of outbound SIP messages as well as the parsing and de-multiplexing of inbound SIP messages. Transaction manager implements the core SIP functionality and supports proxy server, registrar, redirect server, and user agent functionalities. User application manages the correlators and handles used to identify calls, sessions, and transactions in the SIP stack.

By caching information in the SIP demux manager and the session manager, these entities can make routing decisions quicker because lookup time is saved. In some embodiments, the NPU flows can direct the packet flows to the session manager handling the session and the session manager cache can be used for obtaining information regarding the subscriber. The demux manager can direct packets that are not picked up by a NPU flow or are the registration packets from a mobile node, in certain embodiments.

The session manager can act as a registrar and redirect server. A registrar allows the SIP user to register the contact information (IP address/domain name) where the SIP user can be reached. The registrar can be a location service that allows binding between the logical address/public identity of the SIP user with the physical address. A SIP proxy or redirect server can locate the user by contacting the registrar. The registrar can be used by the S-CSCF functionality in the session manager. The P-CSCF and I-CSCF may proxy the registrations. If the session manager is implementing a S-CSCF registrar, registrar 334 (FIG. 3) can contact the CSCF core to get the authentication vector and subscriber information. The registrar can perform the SIP specific registrar functionality, but take directions from the S-CSCF component in CSCF core in some embodiments.

The system of FIG. 3 may maintain a local cache per service or session and also send updates to demux manager of any changes in the registration status because demux manager maintains a local cache as well, in some embodiments. The local cache can store the following information: AOR/public user identity, private user identity (unique for a subscriber, could be IMSI), contact information, registration expiry, registration status (active, expired), service route header, auth vector, and subscriber profile. The local cache entry may be deleted once the subscriber deregisters and may maintain one such entry for every public user identity for that subscriber.

In certain embodiments, information is cached locally to reduce setup delay that is caused from retrieving information from external databases. In some embodiments, when a subscriber registers for a first time, the location information provided in the registration message is stored in the demux manager. A process instance can be allocated for keeping the subscribers call state and contact information. Other information can also be stored. This information is used so that a call coming to or from the demux manager is directed to the process instance handling the session. The information can also be used to distribute the traffic so that a bottleneck does not occur at the demux manager.

In some embodiments, a cache including information from a registration message is used to distribute traffic coming in, e.g., from a public switched telephone network (PSTN) or a SIP interconnect. This can be implemented by storing the IP address and a handle, such as the Address of Record (AoR). The AoR can be a SIP handle such as sip:name@starentnetworks.com or sip:phonenumber@starentnetworks.com;user=phone or a tel:phonenumber which is a tel URI. This handle information is generally stored in another database and lookup can take some time. Thus, when a registration message comes in it can use information, such as the SIP handle and do a reverse lookup in the database and get information including the telephone number to place in the cache. This database information can be used when a request comes in from PSTN with a telephone number. The telephone number can be matched against the information in the cache to route the traffic flow to the process instance handling the call session.

In certain embodiments, a network processing unit (NPU) directs traffic to the process instance that handles the call session bypassing the demux manager and the signaling routing layer (see FIG. 3). The NPU can use a hash key to determine if the demux manager can be bypassed. If there is a hash hit, the traffic is routed directly to session manager process instance handling the call. The process instance can be given an internal address so the traffic can be directed to it. This internal address is used by NPU to send the incoming packet to correct session manager instance after hash hit.

In certain embodiments, the system of FIG. 3 caches subscriber and various network SIP node's presence locally and uses various network addresses learnt during subscriber registration to distribute future traffic among internal CSCF processing functions as well as external CSCF components. This system can also get the tel URI from the ENUM database for the subscriber's address of record (AoR) during registration process itself so that the lookup during call setup time can be avoided in some embodiments.

Returning to system 100 of FIG. 1, A P-CSCF 101, according to some embodiments, can perform various tasks upon receiving a message. This message can be, for example, in UMM format and use UMM parameter. On receiving a REGISTER message, for example, a P-CSCF can insert a path header and insert a require header containing the option tag "path." The P-CSCF can create a globally unique IMS charging identity (ICID), save it locally and insert it into the ICID parameter of the p-Charging-Vector header. If the security is supported, a P-CSCF can insert the integrity protected parameter with a "yes" value. Otherwise it can insert the integrity protected parameter with the a "no" value. A P-CSCF can insert a P-Visited-Network-ID header field with a pre-provisioned string that identifies the visited network in the home network. Even if the P-CSCF is local, this string can be inserted to be used for logging purposes.

On receiving 401 from S-CSCF a P-CSCF removes IK and CK values and sends a message to security interface for setting up the security association set up as a result of the challenge. If the security is enabled, a security server header can be inserted in the response. Once the positive response is received from security interface, the P-CSCF can send a returnResultSuccess to callLeg.

On receiving 200 OK response to register, a P-CSCF can check the expires header or expires parameter in contact. If it is non-zero then the service route headers for that public user identity can be stored. The security interface can be sent a message to setup the security association, if a new security association is needed. A message can be sent to the security interface to delete the old security association, if the new association is requested. A P-CSCF can return result success/failure to the callLeg to pass the response received from the security interface.

On receiving a request from UE P-CSCF a P-CSCF can match the service route header for that public user identity against the preloaded route header. If the match is not successful, a result error with a 400 response code can be returned to to the callLeg. The P-CSCF's address can be added in the "via" header as configured in the service mode. The P-CSCF's Universal Resource Indicator (URI) can be added in the record route. The P-preferred-ID can removed and the P-Asserted-ID can be added. A globally unique ICID parameter can be created and inserted in the P-charging-Vector header. The result can be sent to the callLeg.

For responses, the P-CSCF can store the value received in the p-charging-function-address header and store the list of record route. The P-CSCF can also change the record route port number to the protected server port number as negotiated with UE during registration.

In some embodiments, a P-CSCF interacts with an IP Security (IPSEC) manager to set up security associations and interact with a policy interface to apply application policies. A P-CSCF can perform I-CSCF discovery in various ways. For example, a P-CSCF can use a configured list of I-CSCF defined by a peering server configuration. In other embodiments, a P-CSCF can perform I-CSCF discovery by using a DNS/Naming Authority Pointer (NAPTR).

IP address spoofing/IMS identity impersonation prevention is provided in certain embodiments. The P-CSCF can compare the IP address the request is received from and the subscriber's contact IP address to make sure the user who is registered is the one trying to make a call. The P-CSCF can also check the IP address allocated at the Packet Data Protocol (PDP) context creation with the IP address in the received SIP request to make sure the user who is paying for the IMS is using its own data access.

In some embodiments, the I-CSCF interfaces with HSS to validate visited network information sent by P-CSCF. If the subscriber is not allowed to roam in the visited network, the HSS sends an error indicating that roaming is not allowed. In certain embodiments, where the CSCF functionality is integrated into a Core CSCF module, the I-CSCF does not have to discover the S-CSCF based on the registering user and capabilities. In the second configuration when P-CSCF is separate I-CSCF is still integrated with S-CSCF therefore discovery is not required. External S-CSCF discovery can also be used by requesting an additional attribute from the HSS and selecting the S-CSCF based on the capabilities requested by the subscriber In some embodiments, a site key mechanism can be used in authenticating a user. For example, a shared secret, such as a picture and/or text phrase can be selected by a mobile user when, for example, an account of the mobile user is established. When the user logs into, for example, a network 100, the network 100 can send the site key to the mobile user so that the mobile user knows the network 100 is legitimate. In addition, if, for example, this is first time a user has logged into from this specific MS, the network 100 can require the user to answer challenge questions, that, for example, were set up when the user established his account.

Figure 6A:
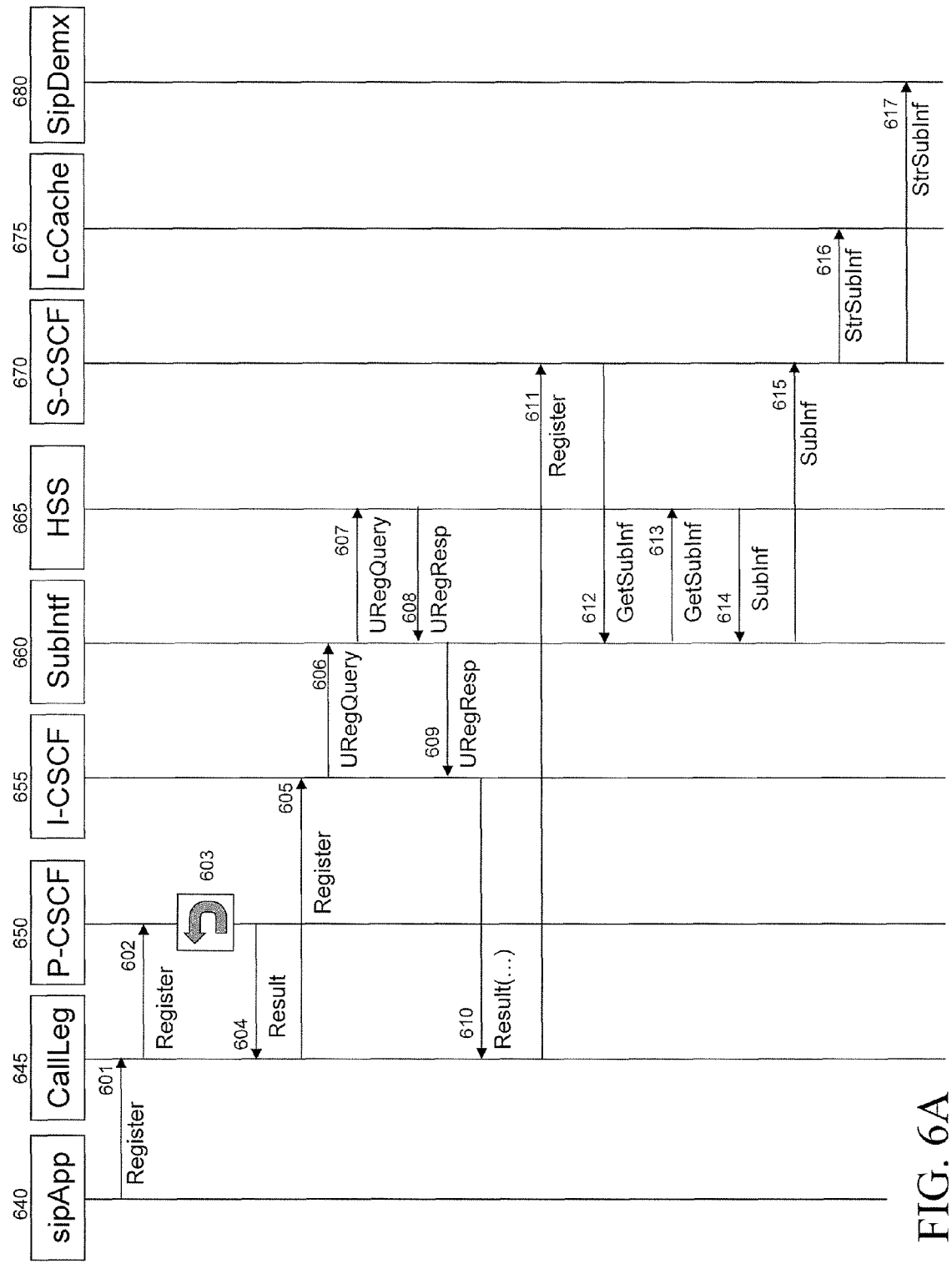
FIG. 6A and FIG. 6B illustrate a registration call flow in accordance with some embodiments of the disclosed subject matter.
Figure 6B:
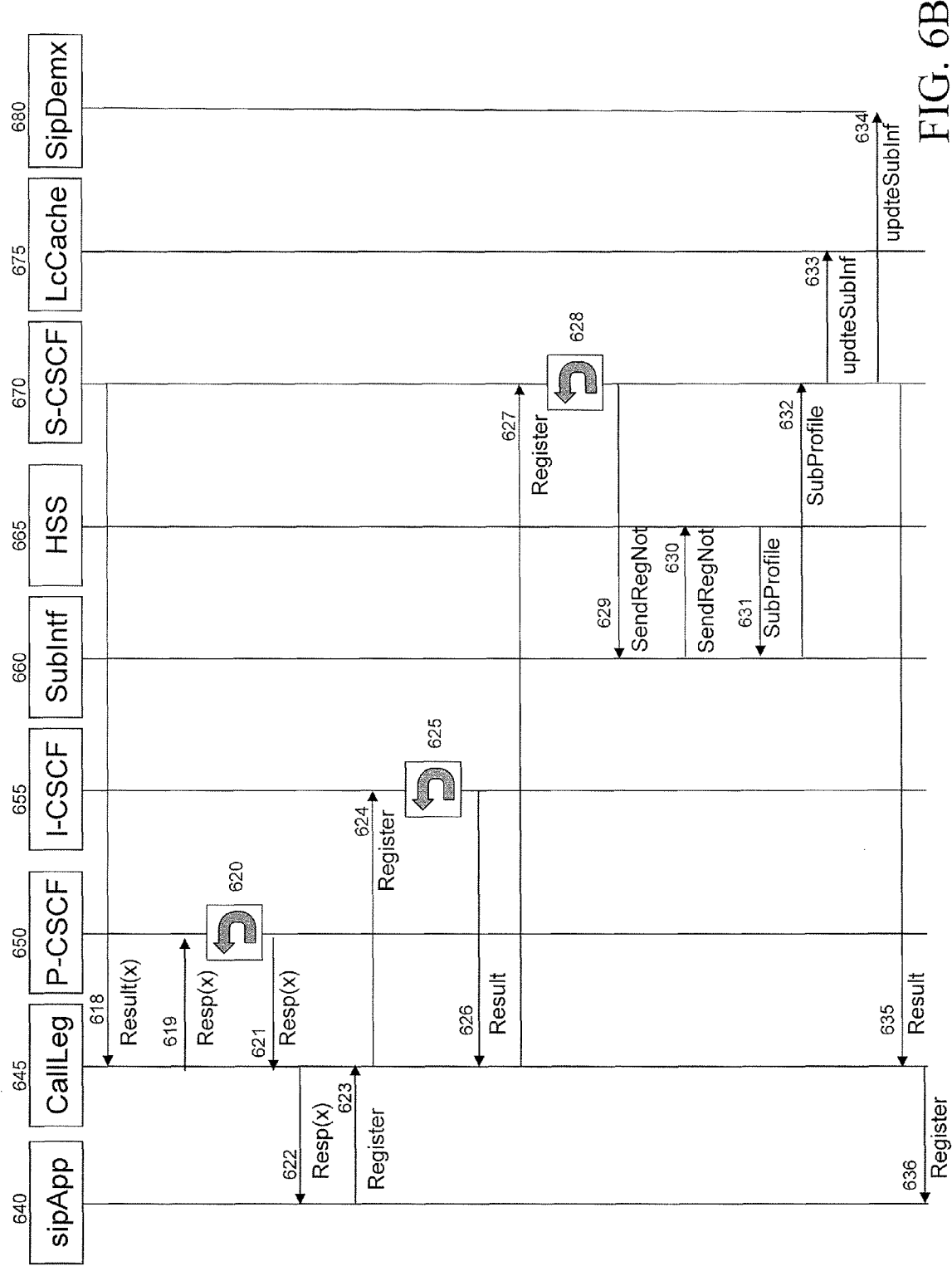

FIGS. 6A and 6B illustrate a registration call flow in accordance with some embodiments of the disclosed subject matter. A SIP application 640 can send, at 601, a register message, such as, for example, a UMM_MSG_REGISTER, to a call leg 645. SIP application 640 can be the entry point for an external message and can be located in session manager 310 of FIG. 3. Call leg 645 can be a data structure located in, for example, a CSCF. Call leg 645 can send, at 602, a register message to a P-CSCF 650. The P-CSCF can examine, at 603, the register message, determine that it is a register message and send, at 604, a return message to the call leg 645. In response, call leg 645 can send, at 605, a register message to the I-CSCF 655. The I-CSCF 655 can send, at 606, a user registration query to a subscriber interface 660. The subscriber interface 660 can be, for example, software that is located in the call processing layer 320 of the session manager 310 of FIG. 3. Subscriber interface 660 can also store various data that can be part of a user profile and can be used for authentication both at the user level and the device level. This data can be stored in, for example, cache 526.

Based on, for example, a user ID, user profile information, and/or services a user has requested, the subscriber interface 660 sends, at 607, a user registration query to Home Subscriber Server (HSS) 665 to request, for example, a S-CSCF to serve this user. HSS 665 can respond, at 608 with information identifying a S-CSCF as well as, for example, information identifying what network the user's call is coming from. HSS 665 can also determine, for example, whether a public ID of the user is associated with a private ID of the user in the message. The public ID can be, for example, the user's address of record. The private ID can be, for example, an International Mobile Subscriber Identity (IMSI). The information provided in the response, at 608, can be passed to the I-CSCF 655, at 609, and the call leg 645, at 610. If, for example, the user is calling from a network with no roaming agreement, the user can be denied service and such denial can be indicated in the result, at 610. At, 611, in response to receiving the result, at 610, and possibly based on the result, call leg 645 can send a register message to the S-CSCF 670 (which can have been identified at 608 from HSS 665 and can be acting as an SIP registrar).

In response to receiving, at 611, a register message, the S-CSCF 670 can send, at 612, a request for subscriber information to the subscriber interface 660. As a result, the subscriber interface 660 requests, at 613, subscriber information from the HSS 665. The HSS 665 provides, at 614, this information to the subscriber interface which, in turn, passes, at 615, the information to the S-CSCF 670. This information can include, for example, the public user ID, the private user ID, contact, registration expiry, registration status (e.g., active, expired), service route header/path header, an authorization vector (including, for example, the user's encrypted password, encrypted responses to user challenge questions, user challenge questions, site key's, etc.), and/or a subscriber profile. The S-CSCF 670 can store, at 616 and/or 617 various parts of the subscriber information in a local cache 675 and/or a SIP Demux 680, for example, all of the information can be stored in the cache 675 and the public user ID and contact can be stored in and/or by the SIP Demux 680, for example in a cache 526.

The S-CSCF 670 can send, at 618 (FIG. 6B), a message along with at least some of the subscriber information to the call leg 645. This message can be, for example, a ReturnResult_401 message. In addition, this message can include a site key. In some embodiments, if, for example, this is the first time a user has logged on to the network using this particular mobile device, the user may be required to answer at least one challenge question such as, "what is your favorite color" or "what is your oldest sister's first name." Challenge questions can be retrieved from, for example, the HSS 665, a web server, cache 675, SIP Demux 680, and/or may have been received, at 615, in subscriber information. In response to receiving, at 618, the return result message, the call leg 645, can send, at 619, a response message to P-CSCF 650. P-CSCF 650 can set up, at 620, a tunnel, such as a Security Association (SA) tunnel between the P-CSCF 650 and the mobile device. P-CSCF 650 can send, at 621, a response message back to call leg 645 and call leg 645 can send, at 622, a response message to SIP application 640. In some embodiments, for example if a tunnel is not to be set up by the P-CSCF 650 in response to receiving, at 618, the return result message, the call leg 645, can send, at 622, a message response to the SIP application 640.

SIP application 640 can interact with the mobile device by, for example, forwarding along a site key and/or challenge question in an SIP message format to the MS. When the mobile user receives the site key he can examine it and decide whether it is his site key. For example, if his site key is a photograph of a house, but the site key he receives is a drawing of a person, he can decide that instead of being connected to the network, his mobile device is being attacked and the user should not reveal his password. In some embodiments, the user's site key can be stored in the mobile devices so that the mobile device can decide whether to provide the password to a network requesting it. Conversely, for example, if the network asks him his favorite color, knowing he had said it was blue when he set up his account, but he now says it is green, the network can deny access and possibly require the mobile device to provide additional evidence to prove that a user's password has not been stolen or otherwise maliciously acquired.

After receiving a response from the mobile device, the SIP application 640 can send, at 623, a register message to call leg 645. I-CSCF 655 can validate, at 625, that the register message, received at 624, is associated with the same user as the register message received at 601. This validation can be performed by comparing a user ID in the register message received at 624 with information stored, for example, in cache 675. Upon successful validation, the I-CSCF 655 can send, at 626, a return result message indicating that validation was successful to call leg 645. The call leg 645 can send, at 627, a register message, to S-CSCF 670. At, 628, the S-CSCF can verify that various pieces of information received, at 627, are correct. For example, answers to challenge questions, passwords, and/or private user IDs can be verified.

S-CSCF 670 can send, at 629, a registration notification to subscriber interface 660 indicating that the mobile device and user are to be authorized and authenticated. In response, subscriber interface 660 can send, at 630, registration notification to HSS 665. HSS 665 can respond, at 631, with the user's subscriber profile and subscriber interface 660 can send, at 632, the same to S-CSCF 670. S-CSCF 670 can update all or parts of the subscriber information in the cache 675 and/or the SIP Demux 680 by sending messages, at 633 and/or 634. The S-CSCF can also send, at 635, an indication of a successful authentication and authorization to call leg 645. Call leg 645 can send, at 636, a register message such as a UMM_MSG_2000K_REGISTER to SIP application 640 and the user can begin to use the network.

At some time after being authenticated a user can log off of the network. The user may then provide his mobile device to a second user who can log back into the network using, for example, the second user's username, public ID, password, and/or challenge question answers. This can enable, for example, a single mobile device to be used by various users and for those various users to have charges related to use billed to their corresponding account. For example, a second person can borrow the phone of a first person, the second person can be registered, authenticated, and authorized using, for example, the method of FIGS. 6A and 6B and the second person can have any related charges charged to the second person's account. In some embodiments, the systems and methods can be used to authenticate and authorize a user of an SIP landline phone to a network. For example, a user can log into a network to check his voice mail or to access other services. This can provide an advantage, of, for example a user using someone else's mobile device is using his own airtime minutes not the mobile device owner's minutes to check his voicemail In another example, a company can provide a single mobile device for use by various employees. For example, a trucking company can provide a mobile device affixed to a truck and various employee truck drivers can be registered, authenticated, and authorized using their account so that, for example, the employer can determine which employee is responsible for which charges and/or to know the location of a logged in employee.

In various embodiments, a user can pay for additional services. For example, a user can purchase additional minutes for use by the user's account. Payment can be made by a first user by being registered, authenticated, and authorized from a mobile device of second user using, for example, prepaid service's operator assistance.

In some embodiments a user can be logged into a network from various devices at one time. For example, a user could be registered, authenticated, and authorized using the method of FIGS. 6A and 6B from his mobile phone and also be registered, authenticated, and authorized from other devices such as, for example, another mobile device and/or a SIP land line phone.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A gateway in a communications network, comprising
a subscriber interface;
a Session Initiation Protocol (SIP) registrar;
a local cache; and
a network interface in communication with the subscriber interface, the SIP registrar, a subscriber database, and a mobile device; wherein
the SIP registrar is configured to:
receives a first register message sent from the mobile device, the first register message including a request made by a first of a plurality of users for access to a network, wherein a separate user account is maintained for each of the plurality of users in the network and wherein any one of the plurality of users at a time can access the network by logging on and off of the network using the mobile device; and
if the mobile device is not registered in the network,
send a request for subscriber information associated with the mobile device to the subscriber interface, wherein the subscriber information includes a user profile for the mobile device and the user profile includes challenge information for the plurality of users;
the subscriber interface is configured to:
retrieves the subscriber information from the subscriber database; and
send the subscriber information to the SIP registrar; and
the SIP registrar is further configured to:
store the subscriber information in the local cache;
authenticate the mobile device based at least in part on the subscriber information;
send to the mobile device challenge information associated with the first user including a password request and at least one user challenge question previously set up or selected by the first user;
receive a second register message including user response information of the first user in response to the challenge information from the mobile device;
authenticate the first user based at least in part on whether the user response information of the first user matches predetermined answers to the at least one user challenge question, such that the first user's airtime minutes can be used for services provided by the network that are granted specifically for the first user; and
notify the subscriber interface of the authentication of the mobile device and the first user:,
if the mobile device has been registered already in the network,
the SIP registrar is further configured to:
send to the mobile device the challenge information associated with the first user that is stored in the local cache;
receive the second register message from the mobile device;

authenticate the first user based at least in part on whether the user response information of the first user matches the predetermined answers to the at least one user challenge question, such that the first user's airtime minutes can be used for the services provided by the network that are granted specifically for the first user; and notify the subscriber interface of the authentication of the first user.

2. The gateway of claim 1, wherein the subscriber database is a Home Subscriber Server (HSS) and the SIP registrar is a serving call session control function (S-SCF).

3. The gateway of claim 1, wherein authentication includes authentication, authorization, and registration.

4. The method of claim 1, wherein the user challenge question comprises a question that is capable of suggesting a correct answer to the user.

5. The gateway of claim 1, wherein the challenge information further includes an image previously selected by the user and wherein the user does not respond if the user does not recognize the image as the image previously selected by the user.

6. The gateway of claim 1, wherein the SIP registrar includes an SIP application serving as an entry point for external messages including messages.

7. The gateway of claim 6, wherein the SIP application is configured to interact with the mobile device.

8. A method for authenticating a mobile device and a user, comprising:

receiving at a Session Initiation Protocol (SIP) registrar a first register message sent from a mobile device, the first register message including a request made by a first of a plurality of users for access to a network, wherein a separate user account is maintained for each of the plurality of users in the network and wherein any one of the plurality of users at a time can access the network by logging on and off of the network using the mobile device;

if the mobile device is not registered in the network,
sending from the SIP registrar a request for subscriber information to a subscriber interface, wherein the subscriber information is associated with the mobile device and includes a user profile for the mobile device and the user profile includes challenge information for the plurality of users;
retrieving the subscriber information from a subscriber database at the subscriber interface;
sending the subscriber information to the SIP registrar from subscriber interface;
storing the subscriber information in a local cache;
authenticating the mobile device based at least in part on the subscriber information
sending to the mobile device from the SIP registrar challenge information associated with the first user including a password request and at least one user challenge question previously set up or selected by the first user;
receiving a second register message including user response information of the first user in response to the challenge information from the mobile device at the SIP registrar;
authenticating the first user based at least in part on whether the user response information of the first user matches predetermined answers to the at least one user challenge question at the SIP registrar, such that the first user's airtime minutes can be used for services provided by the network that are granted specifically for the first user; and
sending a notification of authentication of the mobile device and the first user to the subscriber interface from the SIP registrar; and if the mobile device has been registered already in the network,
sending to the mobile device from the SIP registrar the challenge information associated with the first user that is stored in the local cache;
receiving at the SIP registrar the second register message from the mobile device;
authenticating the first user based at least in part on whether the user response information of the first user matches the predetermined answers to the at least one user challenge question at the SIP registrar, such that the first user's airtime minutes can be used for the services provided by the network that are granted specifically for the first user; and
sending a notification of authentication of the first user to the subscriber interface from the SIP registrar.

9. The method of claim 8, wherein the subscriber database is a Home Subscriber Server (HSS) and the SIP registrar is a serving call session control function (S-SCF).

10. The method of claim 8, wherein authentication includes authentication, authorization, and registration.

11. The method of claim 8, wherein the challenge information further includes an image previously selected by the user and wherein the user does not respond if the user does not recognize the image as the image previously selected by the user.

12. The method of claim 8, wherein the user challenge question comprises a question that is capable of suggesting a correct answer to the user.

13. The method of claim 8, wherein the SIP registrar includes an SIP application serving as an entry point for external messages including messages received from the mobile device.

14. A non-transitory computer-readable medium storing computer-executable instructions that, when executed by a processor, cause the processor to perform a method, the method comprising:

receiving at a Session Initiation Protocol (SIP) registrar a first register message sent from a mobile device, the first register message including a request made by a first of a plurality of users for access to a network, wherein a separate user account is maintained for each of the plurality of users in the network and wherein any one of the plurality of users at a time can access the network by logging on and off of the network using the mobile device;

if the mobile device is not registered in the network,
sending from the SIP registrar a request for subscriber information to a subscriber interface, wherein the subscriber information is associated with the mobile device and includes a user profile for the mobile device and the user profile includes challenge information for the plurality of users;
retrieving the subscriber information from a subscriber database at the subscriber interface;
sending the subscriber information to the SIP registrar from subscriber interface;
storing the subscriber information in a local cache;
authenticating the mobile device based at least in part on the subscriber information;
sending to the mobile device from the SIP registrar challenge information associated with the first user including a password request and at least one user challenge question previously set up or selected by the first user;

receiving a second register message including user response information of the first user in response to the challenge information from the mobile device at the SIP registrar;

authenticating the first user based at least in part on whether the user response information of the first user matches predetermined answers to the at least one user challenge question at the SIP registrar, such that the first user's airtime minutes can be used for services provided by the network that are granted specifically for the first user; and sending a notification of authentication of the mobile device and the first user to the subscriber interface from the SIP registrar; and if the mobile device has been registered already in the network, sending to the mobile device from the SIP registrar the challenge information associated with the first user that is stored in the local cache;

receiving at the SIP registrar the second register message from the mobile device;

authenticating the first user based at least in part on whether the user response information of the first user matches the predetermined answers to the at least one user challenge question at the SIP registrar, such that the first user's airtime minutes can be used for the services provided by the network that are granted specifically for the first user; and sending a notification of authentication of the first user to the subscriber interface from the SIP registrar.

15. The computer-readable medium of claim 14, wherein the subscriber database includes a Home Subscriber Server (HSS) and the SIP registrar includes a serving call session control function (S-CSCF).

16. The computer-readable medium of claim 14, wherein authentication includes authentication, authorization, and registration.

17. The computer-readable medium of claim 14, wherein the challenge information further includes an image previously selected by the user and wherein the user does not respond if the user does not recognize the image as the image previously selected by the user.

18. The computer-readable medium of claim 14, wherein the user challenge question comprises a question that is capable of suggesting a correct answer to the user.

* * * * *

UNITED STATES PATENT AND TRADEMARK OFFICE
CERTIFICATE OF CORRECTION

PATENT NO. : 8,250,634 B2
APPLICATION NO. : 11/950682
DATED : August 21, 2012
INVENTOR(S) : Kaitki Agarwal et al.

It is certified that error appears in the above-identified patent and that said Letters Patent is hereby corrected as shown below:

In the Claims:

In claim 1, column 16, line 59, please delete ":,", after "user" and add a --;--

In claim 2, column 17, line 12, "(S-SCF)" should read --(S-CSCF)--

In claim 8, column 17, line 53, please add a --;--, after "information"

In claim 9, column 18, line 24, "(S-SCF)" should read --(S-CSCF)--

Signed and Sealed this
Twenty-first Day of May, 2013

Teresa Stanek Rea
*Acting Director of the United States Patent and Trademark Office*